United States Patent
Moine

(10) Patent No.: US 12,442,343 B2
(45) Date of Patent: Oct. 14, 2025

(54) METHOD FOR ESTIMATING THE ATMOSPHERIC PRESSURE OF AN INTERNAL COMBUSTION ENGINE

(71) Applicant: Vitesco Technologies GmbH, Regensburg (DE)

(72) Inventor: Xavier Moine, Toulouse (FR)

(73) Assignee: Vitesco Technologies GmbH, Regensburg (DE)

( * ) Notice: Subject to any disclaimer, the term of this patent is extended or adjusted under 35 U.S.C. 154(b) by 1 day.

(21) Appl. No.: 18/701,396

(22) PCT Filed: Oct. 10, 2022

(86) PCT No.: PCT/EP2022/078092
§ 371 (c)(1),
(2) Date: Apr. 15, 2024

(87) PCT Pub. No.: WO2023/072565
PCT Pub. Date: May 4, 2023

(65) Prior Publication Data
US 2025/0243822 A1 Jul. 31, 2025

(30) Foreign Application Priority Data
Oct. 27, 2021 (FR) .................................. 2111381

(51) Int. Cl.
*F02D 41/18* (2006.01)
(52) U.S. Cl.
CPC .................................. *F02D 41/18* (2013.01)
(58) Field of Classification Search
CPC .... F02D 41/18; F02D 41/144; F02D 41/1441; F02D 2200/0408
See application file for complete search history.

(56) References Cited

U.S. PATENT DOCUMENTS

| 4,574,265 A | 3/1986 | Kaiser et al. |
| 4,905,155 A | 2/1990 | Kanno |

(Continued)

FOREIGN PATENT DOCUMENTS

| CN | 103256131 A | 8/2013 | |
| CN | 104675549 A * | 6/2015 | ........... F02D 41/222 |

(Continued)

OTHER PUBLICATIONS

International Search Report (PCT/ISA/210) with translation and Written Opinion (PCT/ISA/237) mailed on Feb. 6, 2023 by the European Patent Office as the International Searching Authority for International Application No. PCT/EP2022/078092. (16 pages).

*Primary Examiner* — Hung Q Nguyen
(74) *Attorney, Agent, or Firm* — Buchanan Ingersoll & Rooney PC

(57) ABSTRACT

A method for determining the atmospheric pressure for a combustion engine having a cylinder, a throttle valve and an air intake valve admitting air into the cylinder, as well as a pressure sensor between the throttle valve and the intake valve. The method including the following steps: measuring a first pressure at a given angular position of the engine; measuring a second pressure at a predetermined time interval after the measuring of the first pressure; from other parameters, determining an estimated value for the atmospheric pressure. The time interval corresponding to a half-period of a pressure pulsation experienced as air is admitted into the engine, and an average pressure corresponding to the mean of the first pressure and of the second pressure being used, with the other possible parameters, to determine the atmospheric pressure.

11 Claims, 2 Drawing Sheets

(56) References Cited

U.S. PATENT DOCUMENTS

| | | | |
|---|---|---|---|
| 4,911,128 A | 3/1990 | Hara et al. | |
| 5,069,063 A | 12/1991 | Chrobaczek et al. | |
| 6,834,542 B2 | 12/2004 | Aschner et al. | |
| 6,889,664 B2 | 5/2005 | Worth et al. | |
| 7,801,691 B2 | 9/2010 | Panciroli et al. | |
| 9,708,996 B2 | 7/2017 | Leone et al. | |
| 9,726,098 B2 | 8/2017 | Shirasaki et al. | |
| 10,240,545 B2 | 3/2019 | Pursifull et al. | |
| 10,513,993 B2 | 12/2019 | Yamamura | |
| 11,208,965 B2 | 12/2021 | Heinken et al. | |
| 2003/0037770 A1 * | 2/2003 | Kishibata | F02D 41/2451 123/478 |
| 2003/0221480 A1 | 12/2003 | Aschner et al. | |
| 2015/0184607 A1 | 7/2015 | Leone et al. | |
| 2016/0069285 A1 * | 3/2016 | Watanuki | F02D 41/145 701/108 |
| 2020/0200113 A1 | 6/2020 | Braun et al. | |

FOREIGN PATENT DOCUMENTS

| | | | | |
|---|---|---|---|---|
| CN | 104832303 A * | 8/2015 | | F02D 41/0002 |
| CN | 106762176 A | 5/2017 | | |
| CN | 106894902 A | 6/2017 | | |
| DE | 3212561 A1 | 10/1983 | | |
| DE | 19919931 A1 * | 11/1999 | | F02D 41/28 |
| DE | 10212160 B4 * | 4/2007 | | F01L 1/34 |
| EP | 1433944 A1 | 6/2004 | | |
| EP | 2037108 A2 | 3/2009 | | |
| EP | 1433944 B1 | 8/2012 | | |
| FR | 2835281 A1 | 8/2003 | | |
| JP | H01172727 A * | 7/1989 | | |
| JP | H08240146 A * | 9/1996 | | |
| JP | H11315747 A * | 11/1999 | | F02D 41/32 |
| JP | 2002030981 A * | 1/2002 | | |
| JP | 2003176749 A * | 6/2003 | | F02D 41/18 |
| JP | 2005009448 A * | 1/2005 | | |
| JP | WO2003033897 A1 * | 2/2005 | | F02D 35/024 |
| JP | 3788290 B2 * | 6/2006 | | F02D 41/28 |
| JP | 4605041 B2 | 10/2010 | | |
| JP | 5372664 B2 | 9/2013 | | |
| JP | 2017194034 A | 10/2017 | | |
| JP | 6253698 B2 | 12/2017 | | |
| KR | 20190070865 A | 6/2019 | | |
| WO | 8907241 A1 | 8/1989 | | |
| WO | 8911033 A1 | 11/1989 | | |
| WO | 03018978 A2 | 3/2003 | | |
| WO | WO-03031793 A1 * | 4/2003 | | F02D 41/18 |

* cited by examiner

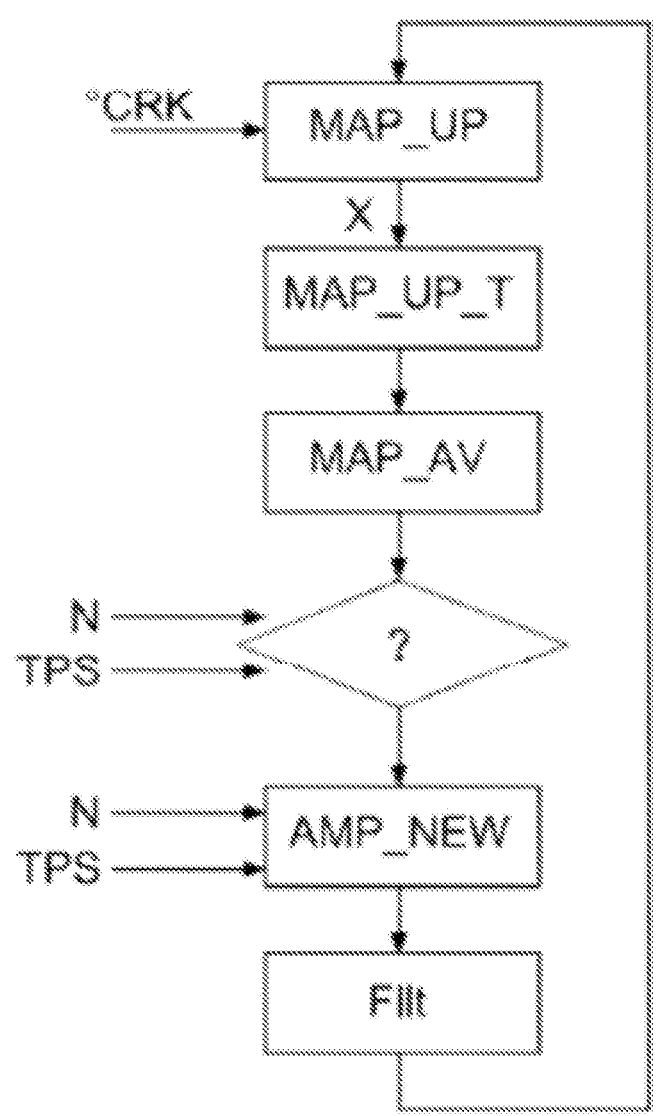

METHOD FOR ESTIMATING THE ATMOSPHERIC PRESSURE OF AN INTERNAL COMBUSTION ENGINE

CROSS REFERENCE TO RELATED APPLICATIONS

This application is the U.S. National Phase Application of PCT International Application No. PCT/EP2022/078092, filed Oct. 10, 2022, which claims priority to French Patent Application No. 2111381, filed Oct. 27, 2021, the contents of such applications being incorporated by reference herein.

FIELD OF THE INVENTION

The present disclosure relates to a method for estimating the atmospheric pressure for an internal combustion engine.

The present disclosure is part of the field of the management of internal combustion engines, notably in the automotive field in the broadest sense, meaning any type of vehicle that travels along the road, such as an automobile, a motorbike, a truck, etc., propelled by an internal combustion engine.

BACKGROUND OF THE INVENTION

It is known practice to determine the atmospheric pressure using data from a pressure sensor positioned in an air intake manifold, namely between a throttle body containing a throttle valve, and an intake valve. Such a pressure sensor is used for determining the supply air flow. Using a pressure measurement from this sensor, generally at bottom dead center, it is then possible to determine a flow of air entering the engine, or the engine air filling, on the basis of the result of the measurement and also of the engine speed and of the position of the throttle valve.

Using this same pressure sensor, it is possible, again as a function of the engine speed and of the position of opening of the throttle valve, to estimate the atmospheric pressure by measuring the pressure a little before the valve-overlap top dead center, namely the top dead center at which all the relevant valves (intake and exhaust) are open, for example 30° CRK before this top dead center.

At the end of the exhaust stroke, before the start of and during intake, pressure pulsations may be observed. The amplitude of these pulsations varies with engine load. Because of these pulsations, when the pressure is measured in order to determine the atmospheric pressure, this measurement may, depending on circumstances, be taken at any point during a pulsation when this pulsation has its maximum value, its minimum value, or indeed any intermediate value. In certain engine configurations and under certain (engine load, speed) conditions, the variation in pressure between a pulsation maximum and a pulsation minimum may be of the order of 100 mbar (namely around 100 hPa).

Document EP2037108A2, incorporated herein by reference, relates to a method for the acquisition and processing of an intake pressure signal in an internal combustion engine with no intake manifold, the internal combustion engine having at least one cylinder which receives fresh air via an intake duct, which is controlled by a throttle valve and comprises a pressure sensor connected to an electronic control unit. In order to determine the atmospheric pressure when the internal combustion engine is running and the throttle valve is not fully open, the following steps are performed: a start angle and an end angle for a measurement window which is dependent on the engine speed are determined; the pressure sensor is used to measure the instantaneous induction pressure at a plurality of different crank angles distributed across the measurement window; a compensation factor dependent on the engine speed and on the throttle valve position is determined; and the atmospheric pressure is determined by applying the compensation factor to the mean of the instantaneous induction pressures measured in the measurement window.

SUMMARY OF THE INVENTION

An aspect of the present disclosure will improve the situation. An aspect of the present disclosure is a method that enables atmospheric pressure to be determined quickly.

Advantageously, the method of determination will require little by way of computational resources from the electronics associated with the engine.

Advantageously, the method will be able to be used both at light load and at heavy load.

What is proposed is a method for determining the atmospheric pressure for a combustion engine comprising at least one cylinder supplied with air by an intake device comprising a throttle valve and at least one air intake valve admitting air into said cylinder, as well as a pressure sensor measuring a pressure prevailing between said throttle valve and said at least one intake valve, said method comprising the following steps:

measuring a first pressure supplied by said pressure sensor at a given angular position of the engine, from the measured pressure and possibly from other parameters such as an engine speed and/or a position of said throttle valve, determining an estimated value for the atmospheric pressure.

According to an aspect of the present disclosure, said method further comprises a step of measuring a second pressure supplied by the pressure sensor at a predetermined time interval after the measuring of the first pressure, said time interval corresponding to an odd-numbered multiple of a half-period of a pressure pulsation that said pressure sensor may experience as air is admitted into the engine, and an average pressure corresponding to the mean of the first pressure and of the second pressure is used, with the other possible parameters, to determine the atmospheric pressure.

This method relies on the novel observation whereby the pressure pulsations experienced by the pressure sensor exhibit a period that is constant, said period being dependent solely on the structure of the engine. Thus, for a given engine, this period does not vary and is the same for similar engines. Thus, averaging two measured values makes it possible to obtain the average pressure across all of the pulsation. An estimate of the atmospheric pressure is thus obtained quickly and at low expense in terms of computational resources.

The features set out in the following paragraphs can optionally be implemented independently of one another or in combination with one another:

the first pressure is measured between 90° CRK and 0° CRK before a top dead center referred to as the valve-overlap top dead center for which said at least one intake valve and a corresponding exhaust valve are open;

the time interval between the measuring of the first pressure and the measuring of the second pressure corresponds to one half-period of the pressure pulsation that the pressure sensor may experience as air is admitted into the engine;

said method further comprises a step of first-order filtering of the determined atmospheric pressure.

According to another aspect, the present disclosure also relates to a computer program, comprising program code instructions for executing all of the steps of a method described hereinabove when said program is executed on a computer, notably an electronic control unit of an internal combustion engine.

According to another aspect, the present disclosure also relates to a computer-readable storage medium on which there is recorded a program according to the preceding paragraph.

According to another aspect, the present disclosure also relates to an internal combustion engine comprising:

at least one cylinder supplied with air by an intake device comprising a throttle valve and at least one air intake valve admitting air into said cylinder, as well as a pressure sensor measuring a pressure prevailing between said throttle valve and said at least one intake valve, and an electronic control unit, characterized in that the electronic control unit is configured to:

measure a first pressure supplied by said pressure sensor at a given angular position of the engine, measure a second pressure supplied by the pressure sensor at a predetermined time interval after the measuring of the first pressure, calculate an average pressure corresponding to the mean of the first pressure and of the second pressure, from the average pressure and possibly from other parameters such as an engine speed and/or a position of said throttle valve, determine an estimated value for the atmospheric pressure, and in that said time interval corresponds to an odd-numbered multiple of a half-period of a pressure pulsation that said pressure sensor may experience as air is admitted into the engine.

Such an engine may comprise several pressure sensors arranged between a throttle valve and an intake valve. In this configuration, the pressure measurements for determining the atmospheric pressure are advantageously taken using just one of said pressure sensors.

BRIEF DESCRIPTION OF THE DRAWINGS

Further features, details and advantages will become apparent on reading the following detailed description, and on studying the appended drawing, in which:

FIG. 1 shows a schematic view of an internal combustion engine.

FIG. 2 illustrates a method for determining the atmospheric pressure according to an aspect of the present disclosure from a curve of pressure reading, recorded by a pressure sensor of the engine of FIG. 1, as a function of time.

FIG. 3

FIG. 3 shows a flow diagram for one preferred embodiment of a method for determining the atmospheric pressure in an internal combustion engine.

DETAILED DESCRIPTION OF THE PREFERRED EMBODIMENTS

Figure 1:
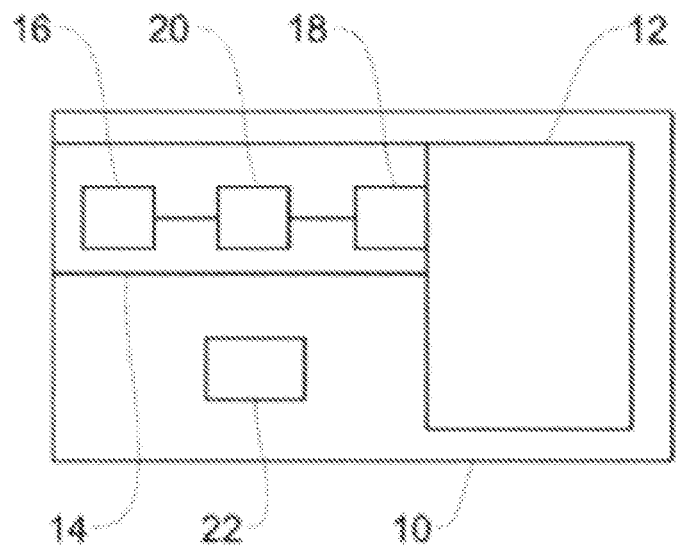
FIG. 1

Reference is now made to FIG. 1. This figure very schematically illustrates an internal combustion engine 10.

As is known to those skilled in the art, such an engine comprises at least one cylinder 12 in which an air/fuel mixture is burnt to provide a motive force that is transmitted to a crankshaft. An air supply device 14 is provided to supply the cylinder 12 with air. This device causes air from outside the engine to pass through a throttle valve 16 which allows the flow rate of air supplied to the cylinder 12 to be regulated. The ingress of air into the cylinder 12 is controlled by at least one valve 18 (it is commonplace to have two intake valves per cylinder). A pressure sensor 20 is present in the air supply system 14 between the throttle valve 16 and the valve(s) 18. Hereinafter, for the sake of simplicity, mention will be made of just one intake valve 18 even in the case of figures where there are several intake valves per cylinder.

The pressure sensor 20 is first of all used to determine the pressure of the air (or of an air/fuel mixture) just upstream of the cylinder 12 so as thus to be able to determine the quantity of air entering the cylinder 12 for each combustion.

As is known to those skilled in the art, there are a number of known engine configurations. An engine may have one or more cylinders. In a multi-cylinder engine it is possible to have one throttle valve 16 and an intake manifold housing the pressure sensor 20 common to all the cylinders, the valves 18 of course being specific to each cylinder 12. As a variant, a throttle valve 16 and an intake manifold with a pressure sensor 20 may be common to several cylinders, or else there may be as many pressure sensors 20 as there are cylinders.

As is known, it is possible using the pressure sensor 20 to determine the atmospheric pressure prevailing upstream of the throttle valve 16. Usually, a pressure measurement is taken prior to a phase of admitting air into the cylinder. The throttle valve 16 is then open and the intake valve 18 is still closed. The pressure downstream of the throttle valve 16 therefore tends to equalize with the atmospheric pressure upstream of the throttle valve 16. However, depending on the extent to which the throttle valve 16 is open (closed, partially open, wide-open) and depending on the engine speed, the pressure downstream of the throttle valve may not have time to equalize with the pressure upstream, but there are tables that can be used to determine the atmospheric pressure upstream of said throttle valve 16 from the pressure measured by the pressure sensor 20, the engine speed N and the position of opening TPS of the throttle valve 16.

Such a pressure measurement by the pressure sensor 20 is taken most often before the engine passes through a valve-overlap top dead center, namely before it passes through a top dead center when the intake valve and the exhaust valve are open, for example between 90° CRK (namely 90° of rotation, measured on the crankshaft of the engine concerned) and 0° CRK, preferably at around 60° CRK before the valve-overlap top dead center.

Figure 2:
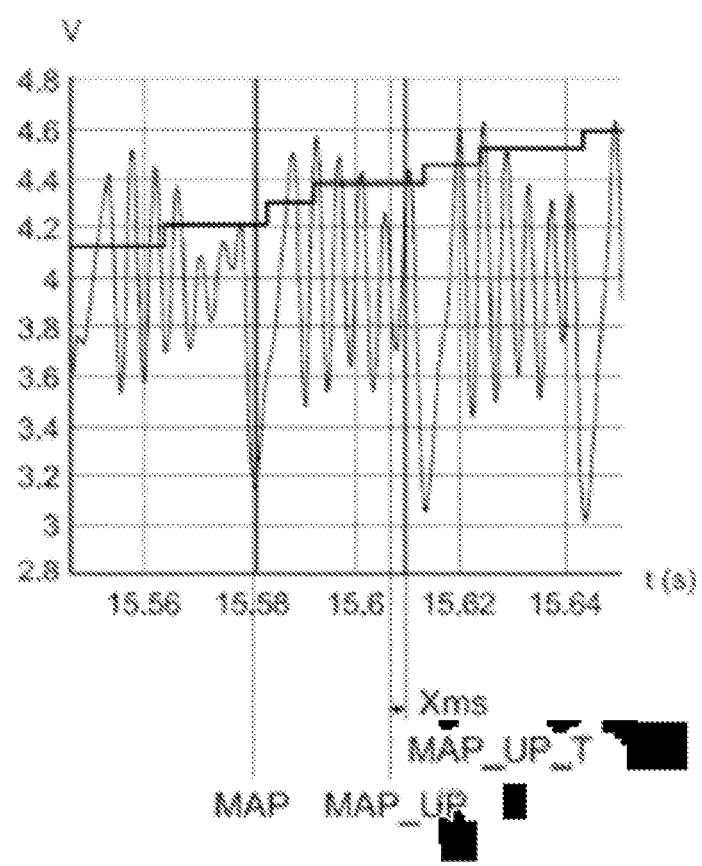
FIG. 2

However, the pressure in the intake manifold, namely between the throttle valve 16 and the intake valve 18, does not vary linearly. FIG. 2 illustrates pressure variations that may be measured by a pressure sensor 20 in an intake manifold as a function of time t in seconds(s). FIG. 2 shows the variations in voltage in volts (V) given by the pressure sensor, this being linear with a scaling factor 0 V equivalent to 0 mbar and 4 V equivalent to 1000 mbar. The pressure measurement taken will not yield the same result depending on whether it is taken as the pressure passes through a pressure peak or as it passes through a pressure trough. Sometimes the difference in pressure between a trough and a peak is relatively small in comparison with the measured pressure, but sometimes this difference can be great, of the order of 100 mbar (i.e. 100 hPa), and thus lead to a greatly underestimated or greatly overestimated pressure value. The +/−0.4 V equivalent to +/−100 mbar pulsations can be seen in FIG. 2.

The method proposed by an aspect of the present disclosure relies on the novel observation whereby the frequency of the pressure pulsations measured by the pressure sensor 20 is dependent solely on the structure of the engine or, more specifically, of the air supply device 14. Therefore, let P (for example in milliseconds (ms or 10(exp-3) s) be the period of these pulsations. By taking a first pressure measurement and then a second pressure measurement at an interval of P/2, the average value of the two measurements taken corresponds to the average value of the pressure over the pulsation. This value is then independent of the position of the measurements of the pressure over the pulsation.

The pressure variations measured by the pressure sensor 20 are illustrated in FIG. 2. A pressure measurement MAP is taken when a piston in the cylinder 12 is at its bottom dead center at the end of a phase of intake into the cylinder 12. It is at this moment that the pressure measured by the pressure sensor 20 during the combustion cycle concerned is at its lowest. This pressure value is representative of the mass of air introduced into the cylinder 12. It is important for controlling the combustion, but not relevant to the present disclosure.

For the method described here, a first pressure MAP_UP is measured at a predetermined engine position shortly before the start of a phase of admitting air into the cylinder 12, for example at 30° CRK before the piston in the cylinder 12 passes through the valve-overlap top dead center.

A pressure measurement that supplies a second pressure MAP_UP_T is taken X ms after the measurement that supplied the pressure value MAP_UP. Here, X=P/2. As a variant, it might potentially be possible to use X=3P/2, particularly depending on the position at which the measurement of the value MAP_UP is taken, if this measurement is taken sufficiently early.

A method for determining atmospheric pressure from these two pressure values MAP_UP and MAP_UP_T is described hereinafter with reference to FIG. 3.

The method proposed here is for example implemented by a central unit 22 of the engine. This central unit 22 notably contains a microprocessor and a memory. It is connected to various engine components. It receives data from sensors, performs calculations on the basis of the data received, and supplies instructions for commanding controllable components.

The central unit 22 is constantly aware of the angular position of the engine (expressed in ° CRK corresponding to the angular position of the engine crankshaft over 720° in the case of an engine termed a four-stroke engine). When a predetermined position is reached, for example 30° CRK before the valve-overlap top dead center for the piston in the cylinder 12, a pressure measurement is taken and yields a first pressure value MAP_UP.

The central unit also incorporates a clock and commands the pressure sensor 20 to take another pressure measurement X ms after the measurement that supplied the first value MAP_UP. This then yields a second pressure value MAP_UP_T.

As already indicated, the value X, given for example in milliseconds, corresponds to the half-period of the pulsations of the pressure prevailing between the throttle valve 16 and the valve 18. This value (X) is fixed. It is dependent on the structure of the engine and stored in the central unit 22.

The next step supplies a value MAP_AV which corresponds to the arithmetic mean of the first pressure value MAP_UP and of the second pressure value MAP_UP_T, namely:

$$MAP\_AV = (MAP\_UP + MAP\_UP\_T)/2$$

It is then necessary to consider the conditions in which this average pressure value (MAP_AV) was obtained. This value will be retained only if it might be representative of the atmospheric pressure, namely if the part of the air supply device downstream of the throttle valve 16 has had the opportunity to equalize, or tend to equalize, with the part upstream of this throttle valve 16. Thus, for high engine speeds N, the value MAP_AV will be retained if the throttle opening value TPS was sufficiently high. At low engine speed N, lower values TPS for the position of the throttle valve 16 may be accepted. The conditions in which consideration is given to the average value MAP_AV are thus dependent both on N (engine speed) and on TPS (value, or angle, of opening of the throttle valve, as a percentage or in degrees).

If the value MAP_AV is retained, it is then possible to determine, as a function of this average value, a new estimate AMP_NEW of the atmospheric pressure. This determination is performed as a function of the speed N and also of the value for the extent of opening of the throttle valve. Specifically, as is evident from the foregoing, the lower the speed N, the more closely the pressure MAP_AV approximates to atmospheric pressure since the pressure downstream has longer to equalize with the pressure upstream of the throttle valve 16. Likewise, the higher the value of TPS, the lower the pressure drop through the throttle valve 16 and therefore the more closely the value of the pressure downstream approximates to the pressure upstream of this valve.

It is therefore possible to define, as a function of the characteristics of the engine, a correction factor FC which is a function of the two variables N and TPS. The estimated value for the atmospheric pressure can then be expressed for example in the form:

$$AMP\_NEW = FC(N, TPS) * MAP\_AV$$

Because atmospheric pressure varies slowly (it varies notably when the vehicle equipped with the engine concerned changes altitude), it is proposed that there be a filtering step (Filt) for filtering the estimated values AMP_NEW and obtaining a final value for the atmospheric pressure.

The method proposed by an aspect of the present disclosure is a responsive and accurate method. It allows an atmospheric-pressure value, that is very close to the true value, to be obtained quickly. This method also works at light engine load. Neither is it dependent on the engine speed: the first measurement is taken at a predetermined engine position and the second measurement is taken at a fixed time interval after the first measurement.

This method is also abstemious in terms of computational resources. Very few calculations are needed and the calculations performed are simple ones. It is also pointed out that two pressure measurements are taken. There is no need here to average a large number of measured values. The estimate is also made quickly because the two measurements are taken over a half-period of a pressure pulsation. There is no need to wait for a complete pulsation or to analyze a complete pulsation in order to obtain an estimate of the atmospheric pressure.

INDUSTRIAL APPLICATION

The present disclosure is not limited to the exemplary embodiment described hereinabove, or to the variants described hereinabove, solely by way of examples, but it encompasses all the variants that those skilled in the art may envision within the context of the protection sought.

The invention claimed is:

1. A method for determining an atmospheric pressure for a combustion engine comprising at least one cylinder supplied with air by an intake device comprising a throttle valve, at least one air intake valve admitting air into said cylinder, and a pressure sensor measuring a pressure prevailing between said throttle valve and said at least one intake valve, said method:
   measuring a first pressure supplied by said pressure sensor at a given angular position of the engine,
   from the measured pressure and other parameters including an engine speed and/or a position of said throttle valve, determining an estimated value for the atmospheric pressure,
   measuring a second pressure supplied by the pressure sensor at a predetermined time interval after the measuring of the first pressure, wherein said time interval corresponds to an odd-numbered multiple of a half-period of a pressure pulsation that said pressure sensor may experience as air is admitted into the engine, and wherein an average pressure corresponding to a mean of the first pressure and of the second pressure is used, with the other parameters, to determine the atmospheric pressure.

2. The method for determining the atmospheric pressure as claimed in claim 1, wherein the first pressure is measured between 90° CRK and 0° CRK before a top dead center referred to as the valve-overlap top dead center for which said at least one intake valve and a corresponding exhaust valve are open.

3. The method for determining the atmospheric pressure as claimed in claim 2, wherein the time interval between the measuring of the first pressure and the measuring of the second pressure corresponds to one half-period of the pressure pulsation that the pressure sensor may experience as air is admitted into the engine.

4. The method for determining the atmospheric pressure as claimed in claim 2, further comprising a step of first-order filtering of the determined atmospheric pressure.

5. The method for determining the atmospheric pressure as claimed in claim 1, wherein the time interval between the measuring of the first pressure and the measuring of the second pressure corresponds to one half-period of the pressure pulsation that the pressure sensor may experience as air is admitted into the engine.

6. The method for determining the atmospheric pressure as claimed in claim 5, further comprising a step of first-order filtering of the determined atmospheric pressure.

7. The method for determining the atmospheric pressure as claimed in claim 1, further comprising a step of first-order filtering of the determined atmospheric pressure.

8. A computer program, comprising program code instructions for executing all of the steps of a method as claimed in claim 1 when said program is executed on an electronic control unit of an internal combustion engine.

9. A non-transitory computer-readable storage medium on which there is recorded a program as claimed in claim 8.

10. An internal combustion engine comprising:
   at least one cylinder supplied with air by an intake device comprising a throttle valve, at least one air intake valve admitting air into said cylinder, and a pressure sensor measuring a pressure prevailing between said throttle valve and said at least one intake valve, and
   an electronic control unit, wherein the electronic control unit is configured to:
      measure a first pressure supplied by said pressure sensor at a given angular position of the engine,
      measure a second pressure supplied by the pressure sensor at a predetermined time interval after the measuring of the first pressure,
      calculate an average pressure corresponding to a mean of the first pressure and of the second pressure,
      from the average pressure and other parameters including an engine speed and/or a position of said throttle valve, determine an estimated value for an atmospheric pressure, and wherein said predetermined time interval corresponds to an odd-numbered multiple of a half-period of a pressure pulsation that said pressure sensor may experience as air is admitted into the engine.

11. The engine as claimed in claim 10, further comprising several pressure sensors arranged between said throttle valve and said at least one intake valve, and wherein the pressure measurements for determining the atmospheric pressure are taken using just one of said pressure sensors.

* * * * *